(12) United States Patent
Wu

(10) Patent No.: US 8,958,598 B2
(45) Date of Patent: Feb. 17, 2015

(54) SYSTEM AND METHOD FOR DETECTING MOVING OBJECTS USING VIDEO CAPTURING DEVICE

(71) Applicant: Chiung-Sheng Wu, New Taipei (TW)

(72) Inventor: Chiung-Sheng Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 233 days.

(21) Appl. No.: 13/631,702

(22) Filed: Sep. 28, 2012

(65) Prior Publication Data

US 2013/0287249 A1 Oct. 31, 2013

(30) Foreign Application Priority Data

Apr. 25, 2012 (TW) .............................. 101114622 A

(51) Int. Cl.
G06K 9/00 (2006.01)
(52) U.S. Cl.
USPC ........................................................ 382/103
(58) Field of Classification Search
CPC ........... G06K 9/62; G06T 2207/20036; G06T 2207/30196; G06T 7/2053
USPC ............................................................ 82/103
See application file for complete search history.

(56) References Cited

U.S. PATENT DOCUMENTS 7,302,004 B2 * 11/2007 Zhang et al. ............. 375/240.16
8,189,049 B2 * 5/2012 Lopota et al. ................. 348/152

* cited by examiner

Primary Examiner — Tom Y Lu
(74) Attorney, Agent, or Firm — Novak Druce Connolly Bove + Quigg LLP

(57) ABSTRACT

Provided is a system for detecting moving objects. The system includes a video capturing device and a detection unit. The video capturing device captures "n" pieces of consecutive images during a time period, where "n" represents a positive integer. The detecting unit selects one of the images as a reference images and processes the other n−1 pieces of images. The detecting unit differentiates the n−1 pieces of images relative to the reference image, grays the differentiated n−1 pieces of images, binarizes the grayed n−1 pieces of imaged, blurs the binarized n−1 pieces of images, dilates the blurred n−1 pieces of images, and detects edges from the dilated n−1 pieces of images.

15 Claims, 5 Drawing Sheets

SYSTEM AND METHOD FOR DETECTING MOVING OBJECTS USING VIDEO CAPTURING DEVICE

BACKGROUND

1. Technical Field

The present disclosure relates to detection systems and methods and, particularly, to a system and method for detecting moving objects using a video capturing device.

2. Description of the Related Art

A method for detecting moving objects includes following steps: capturing a number of images of the moving objects; selecting one of the images as a reference image; differentiating the other images relating to the reference image; graying the differentiated images; binarizing the grayed imaged, and detecting edge from the binarized images to extract edges of the moving objects in each binarized image. Therefore, the moving objects can be detected through the extracted edges. However, the binarized images are usually incomplete, and therefore the extracted edges are much different from actual edges of the moving objects, decreasing detection accuracy.

Therefore, it is desirable to provide a system and method for detecting moving objects, which can overcome the above-mentioned problem.

DETAILED DESCRIPTION OF THE EMBODIMENTS

Figure 1:
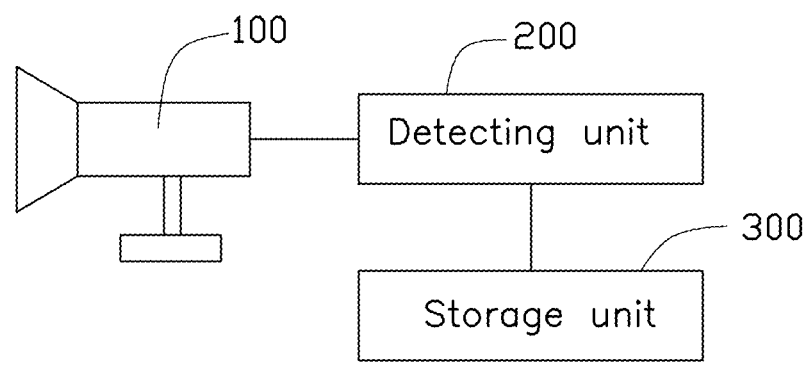
FIG. 1 is a functional block diagram of a system for detecting moving objects which has a video capturing device and a detecting unit, according to an exemplary embodiment.
Figure 2:
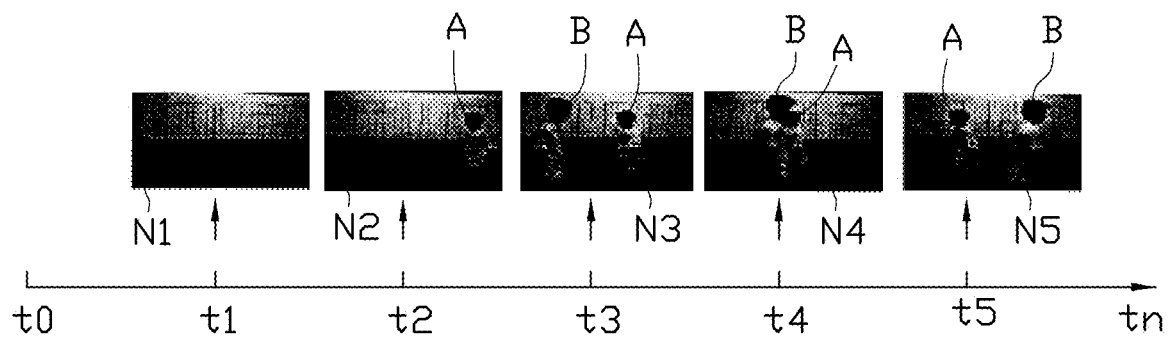
FIG. 2 is a schematic view showing that the video capturing device of FIG. 1 captures n pieces of consecutive images during a time period, wherein n is a positive integer.
Figure 3:
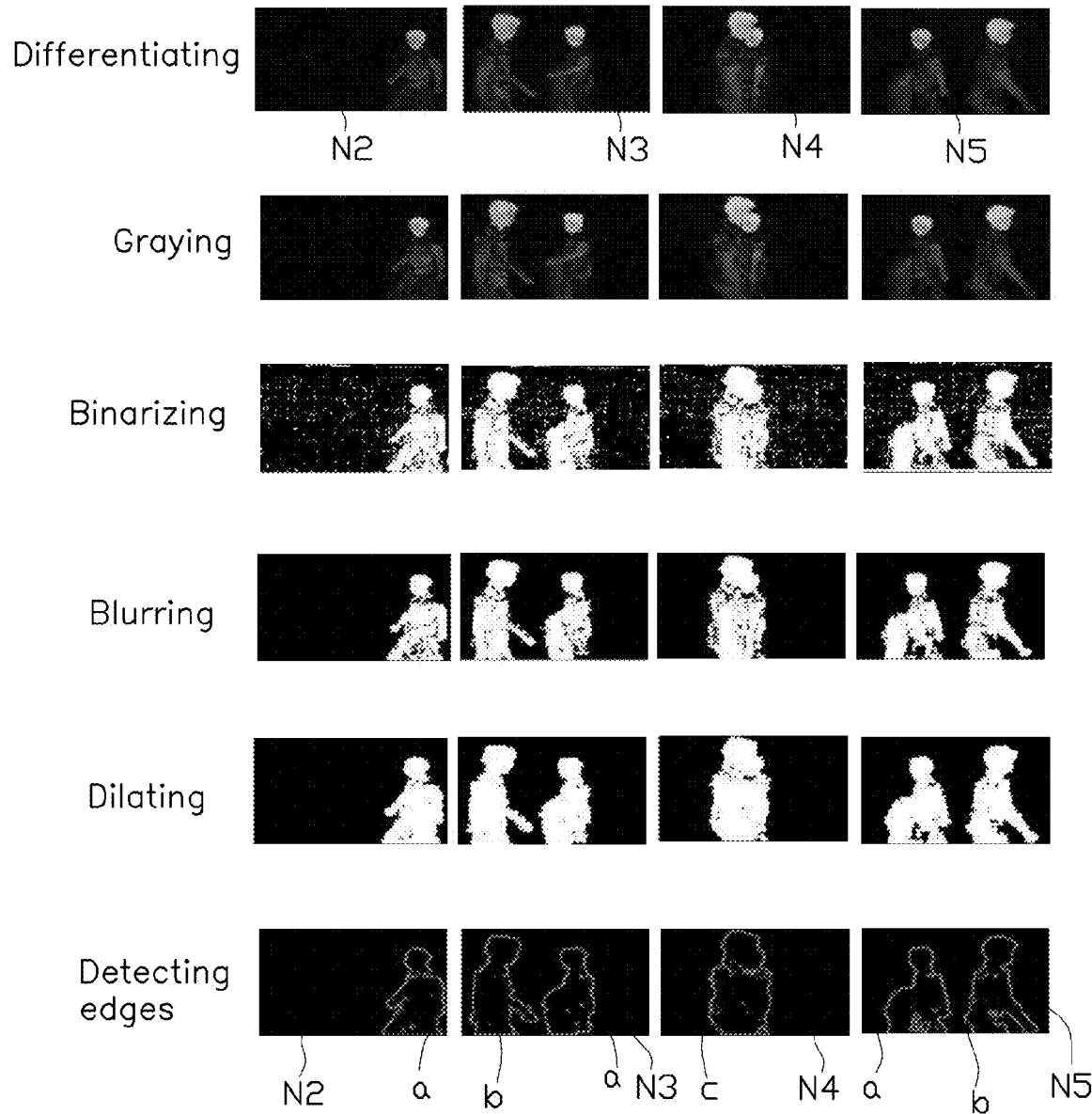
FIG. 3 is a schematic view showing that the detecting unit of FIG. 1 differentiates, grays, binarizes, blurs, dilates, and detects edge from n-1 pieces of images except for a first image of FIG. 2.

Referring to FIGS. 1 to 3, a system 10 for detecting moving objects, according to an exemplary embodiment, is shown. The system 10 includes a video capturing device 100, a detecting unit 200, and a storage unit 300.

The video capturing device 100 can be mounted indoor or outdoor and is configured for capturing video of an area. When the video capturing device 100 is switched on, the video capturing device 100 captures a number of consecutive images. In this embodiment, as shown in FIG. 2, the video capturing device 100 sequentially captures a first image N1 at the moment t1, a second image N2 at the moment t2, a third image N3 at the moment t3, a fourth image N4 at the moment t4, a fifth image N5 at the moment t5, and an N-th image Nn at the moment tn. The capturing device 100 captures n pieces of consecutive images during a time period T from the moment t1 to the moment tn (that is, T=tn-t1). In the embodiment, n is a positive integer, and in one example, n can be five.

As an example, in the first image N1, no moving object is present. In the second image N2, a first moving object A (a first person) appears. In the third image N3, the first moving subject A and a second moving object B (a second person) simultaneously appear, wherein the first moving object A is on the right and moving toward the left while the second moving object B is on the left and moving toward the right. In the fourth image N4, the first moving subject A and the second moving object B simultaneously appear, wherein the first moving object A and the second moving object B overlap with each other. In the fifth image N5, the first moving subject A and the second moving object B simultaneously appear, wherein the first moving object A is on the left and moving toward the right while the second moving object B is on the right and moving toward the left.

The detecting unit 200 is electrically connected to the video capturing device 100. The detecting unit 200 selects the first image N1 of the n pieces of images as a reference image and processes the other n-1 pieces of images except for the first image N1. In the embodiment, the detecting unit 200 sequentially processes the other n-1 pieces of images as follows: differentiating the other n-1 pieces of images relative to the reference image, graying the differentiated n-1 pieces of images, binarizing the grayed n-1 pieces of images, blurring the binarized n-1 pieces of images, dilating the blurred n-1 pieces of images, and detecting edge from the dilated n-1 pieces of images to extract edges from each dilated image. In alternative embodiments, any one of the n pieces of images can be selected as the reference image.

Differentiating the n-1 pieces of images relative to the reference image means to get value differences between each image of the n-1 pieces of images and the reference image. The value differences are obtained by each pixel value of each image of the n-1 pieces of images minus each pixel value of the reference image and then taking absolute values. Each pixel value of the n pieces of images is initially represented by values of red, green, and blue.

Graying the differentiated n-1 pieces of images means to convert each differentiated image to a gray image, namely, each pixel value of each differentiated image is represented by a luminance value instead of being represented by the values of red, green, and blue.

Binarizing the grayed n-1 pieces of images means to compare the luminance value of each pixel of each grayed image to a first predetermined threshold. If the luminance value of each pixel of each grayed image is greater than the first predetermined threshold, set the luminance value of each pixel of each grayed image to be 255, or otherwise set the luminance value of each pixel of each grayed image to be 0. The first predetermined threshold, and in one example, can be 125.

Blurring the n-1 pieces of binarized images means to define a pixel whose luminance value is 255 of each binarized image as a center pixel, and then determine luminance values of other eight pixels around the center pixel. If there are at least two pixels of the eight pixels whose luminance values are 255, set the luminance value of each pixel of the eight pixel to be 255, or otherwise set the luminance value of each pixel of the eight pixel and the center pixel to be 0.

Dilating the blurred n-1 pieces of images means that the luminance value of each pixel of each blurred image multiplies a matrix(M), the matrix(M) is shown as follows:

$$\mathrm{matrix}(M) = \begin{bmatrix} 0 & 1 & 0 \\ 1 & 1 & 1 \\ 0 & 1 & 0 \end{bmatrix}$$

Detecting edge from the dilated n−1 pieces of images means that the luminance value of each pixel of each dilated image respectively multiplies a first matrix Sobel(V) and a second matrix Sobel(H), then take a sum, and finally divided by two. Therefore, it can extract edges from each dilated image. The first matrix Sobel(V) and a second matrix Sobel(H) are shown as follows:

$$\mathrm{Sobel}(V) = \begin{bmatrix} 1 & 0 & 1 \\ 1 & 0 & 1 \\ 1 & 0 & 1 \end{bmatrix}$$

$$\mathrm{Sobel}(H) = \begin{bmatrix} 1 & 1 & 1 \\ 0 & 0 & 0 \\ 1 & 1 & 1 \end{bmatrix}$$

As shown in FIG. 3, in the second image N2, an edge "a" of the moving object A is extracted. In the third image N3, the edge "a" of the moving object A and an edge "b" of the moving object B are extracted, wherein the edge "a" is on the right and the edge "b" is on the left. In the fourth image N4, an edge "c" when the moving object A and the moving object B overlapping with each other is extracted. In the fifth image N5, the edge "a" of the moving object A and the edge "b" of the moving object B are extracted, wherein the edge "a" is on the left and the edge "b" is on the right. Therefore, the moving object A and the moving object B can be detected by the edges "a", "b", and "c" through the image N1 to N5.

In the embodiment, the detecting unit 200 blurs the binarized n−1 pieces of images and dilates the blurred n−1 pieces of images, which can complete the binarized n−1 pieces images. Therefore, the extracted edges "a", "b", and "c" are approximate to actual edges of the moving objects A and B as shown in FIG. 2.

Figure 4:
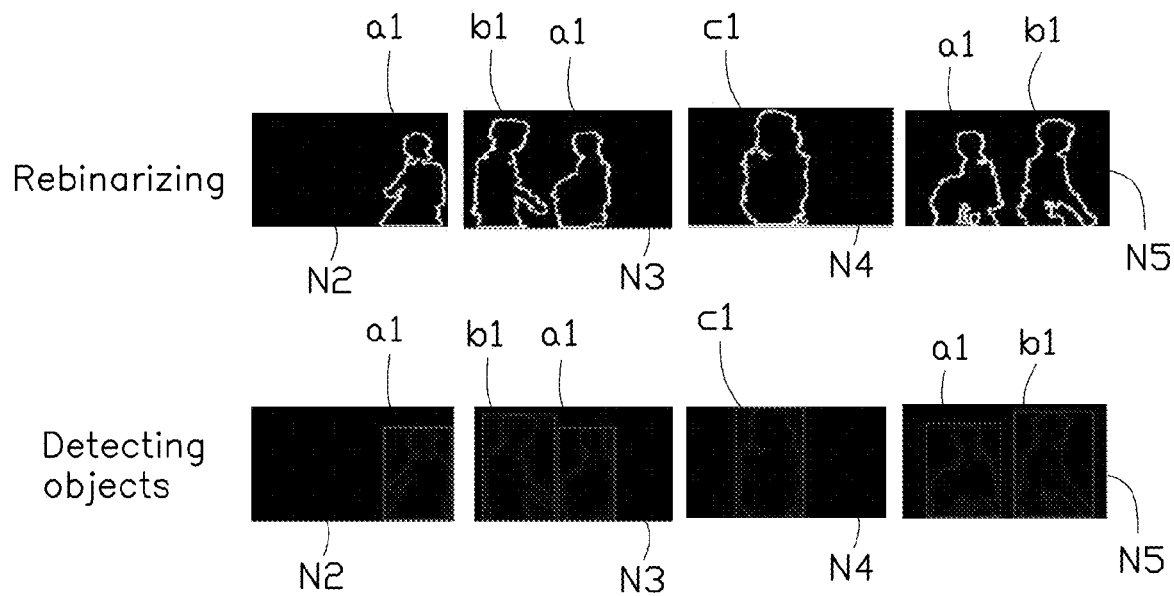
FIG. 4 is a schematic view showing that the detecting unit of FIG. 1 rebinarizes the n-1 pieces of images after detecting edges of FIG. 3 and detects objects from the rebinarized n-1 pieces of images.

Referring to FIG. 4, the detecting unit 200 further rebinarizes the n−1 pieces of images after being detected edges (that is, the detecting unit 200 binarizes the n−1 pieces of images again or for a second time) and detects object from the rebinarized n−1 pieces of images.

Rebinarizing the n−1 pieces of images after detecting edges means to compare the luminance value of each pixel of each image after detecting edges to a second predetermined threshold. If the luminance value of each pixel of each image after detecting edges is greater than the second predetermined threshold, set the luminance value of each pixel of each image after detecting edges to be 255, or otherwise set the luminance value of each pixel of each image after detecting edges to be 0. The second predetermined threshold, and in one example, can be 150.

After rebinarizing the n−1 pieces of images, accordingly, in the second image N2, an enhanced edge "a1" of the moving object A is extracted. In the third image N3, the enhanced edge "a1" of the moving object A and an enhanced edge "b1" of the moving object B are extracted. In the fourth image N4, an enhanced edge "c1" when the moving object A the moving object B overlapping with each other is extracted. In the fifth image N5, the enhanced edge "a1" of the moving object A and the enhanced edge "b1" of the moving object B are extracted.

Detecting objects from the rebinarized n−1 images means to extract objects from each rebinarized n−1 pieces images. Each separate enhanced edge is considered as an object in each rebinarized n−1 pieces of images. As shown in FIG. 4, the enhanced edges "a1", "b1" and "c1" are respectively extracted as an object and surrounded by a respective minimized rectangle which rightly receives the enhanced edges "a1", "b1", and "c1" in corresponding images of the rebinarized n−1 images. Then the extracted objects are stored in the storage unit 300 and can be used by the detecting unit 200 for future detections.

Figure 5:
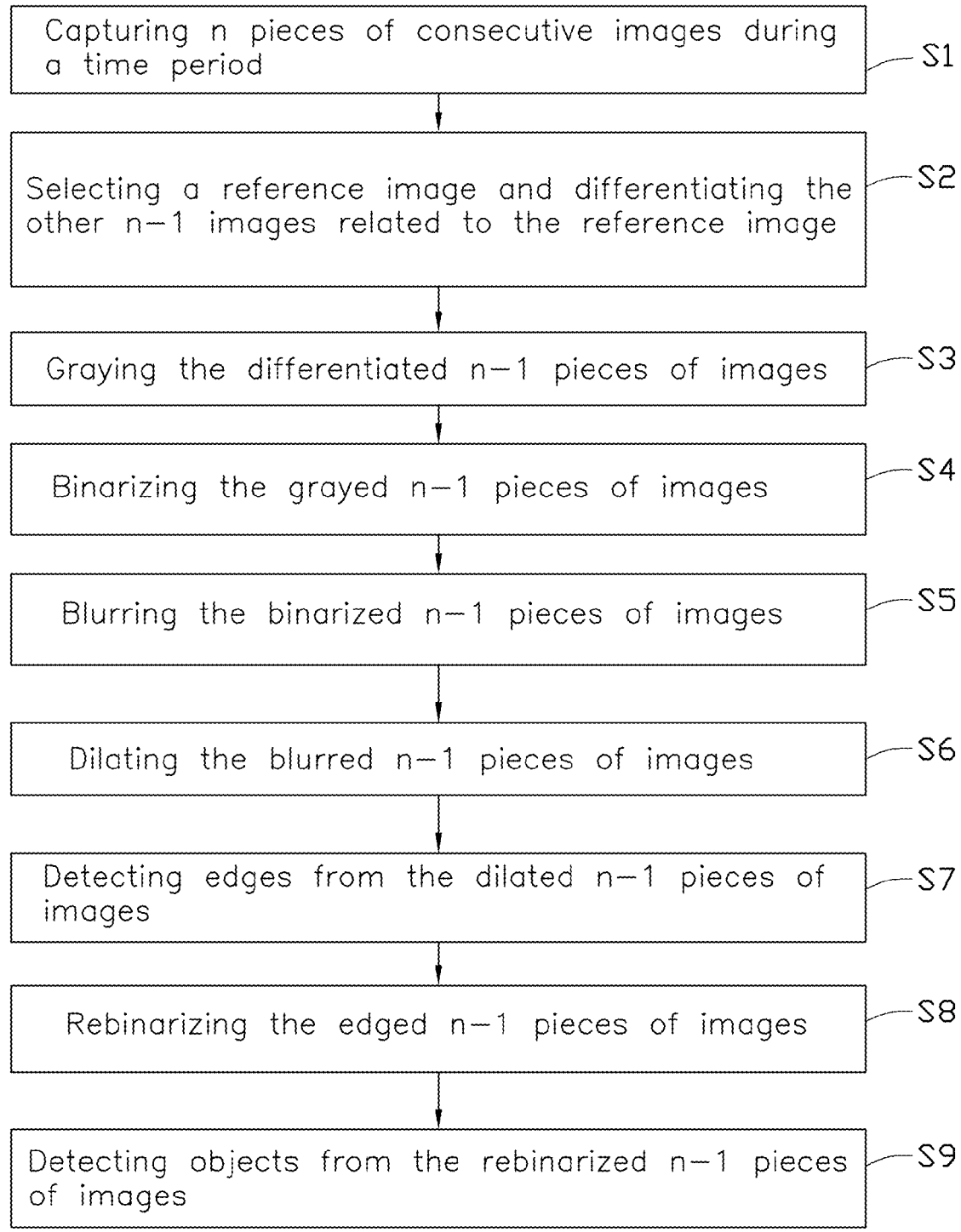
FIG. 5 is flowchart of a method for detecting moving objects, according to an exemplary embodiment.

Referring to FIG. 5, a method for detecting moving objects, according to an exemplary embodiment, can be exemplarily implemented by the system 10 and includes the following steps S1-S9.

S1: switching on a video capturing device 100 to capture n pieces of consecutive images of the moving objects during a time period T.

S2: selecting one of the n pieces of images to as a reference image and differentiating the other n−1 images relating to the reference image. In this embodiment, the first image N1 is selected as the reference image.

S3: graying the differentiated n−1 pieces of images.

S4: binarizing the grayed n−1 pieces of images.

S5: blurring the binarized n−1 pieces of images.

S6: dilating the blurred n−1 pieces of images.

S7: detecting edges from the dilated n−1 pieces of images.

The moving object detection method can further includes the following steps:

S8: rebinarizing the n−1 pieces of images after detecting edges.

S9: detecting objects from the rebinarized n−1 pieces of images.

While the disclosure has been described by way of example and in terms of preferred embodiment, it is to be understood that the disclosure is not limited thereto. To the contrary, it is intended to cover various modifications and similar arrangements, which would be apparent to those skilled in the art. Therefore, the scope of the appended claims should be accorded the broadest interpretation so as to encompass all such modifications and similar arrangements.

It is also to be understood that above description and any claims drawn to a method may include some indication in reference to certain steps. However, the indication used is only to be viewed for identification purposes and not as a suggestion as to an order for the steps.

What is claimed is:

1. A system for detecting moving objects, comprising:
a video capturing device capable of capturing "n" pieces of consecutive images during a time period, wherein "n" represents a positive integer; and
a detecting unit configured for selecting one of the images as a reference images and processing the other n−1 pieces of images, the detecting unit differentiating the n−1 pieces of images relative to the reference image, graying the differentiated n−1 pieces of images, binarizing the grayed n−1 pieces of images, blurring the binarized n−1 pieces of images, dilating the blurred n−1 pieces of images, and detecting edges from the dilated n−1 pieces of images.

2. The system as claimed in claim 1, wherein differentiating the n−1 pieces of images relative to the reference image means to get value differences between each image of the n−1 pieces of images and the reference image, the value differences are obtained by each pixel value represented by values of red, green, and blue of each image of the n−1 pieces of images minus each pixel value of the reference image and then taking absolute values, graying the differentiated n−1 pieces of images means that each pixel value of each differentiated image is represented by a luminance value instead of being represented by the values of red, green, and blue, binarizing the grayed n−1 pieces of images means to compare the luminance value of each pixel of each grayed image to a first predetermined threshold, if the luminance value of each pixel of each grayed image is greater than the first predetermined threshold, the luminance value of each pixel of each grayed image is set to be 255, otherwise the luminance value of each pixel of each grayed image is set to be 0, blurring the n−1 pieces of binarized images means to define a pixel whose luminance value is 255 of each binarized image as a center pixel, and then determine luminance values of other eight pixels around the center pixel, if there are at least two pixels of the eight pixels whose luminance values are 255, the luminance value of each pixel of the eight pixel is set to be 255, otherwise the luminance values of each pixel of the eight pixel and the center pixel are set to be 0; dilating the blurred n−1 pieces of images means that the luminance value of each pixel of each blurred image multiplies a matrix(M); detecting edges from the dilated n−1 pieces of images means that the luminance value of each pixel of each dilated image respectively multiplies a first matrix Sobel(V) and a second matrix Sobel(H), then take a sum, and finally divided by two.

3. The system as claimed in claim 2, wherein a first image of the n pieces of images is selected as the reference image.

4. The system as claimed in claim 2, wherein the matrix(M) is as follows:

$$\text{matrix}(M) = \begin{bmatrix} 0 & 1 & 0 \\ 1 & 1 & 1 \\ 0 & 1 & 0 \end{bmatrix}.$$

5. The system as claimed in claim 2, wherein the first matrix Sobel(V) and the second matrix Sobel(H) are as follows:

$$\text{Sobel}(V) = \begin{bmatrix} 1 & 0 & 1 \\ 1 & 0 & 1 \\ 1 & 0 & 1 \end{bmatrix},$$

$$\text{Sobel}(H) = \begin{bmatrix} 1 & 1 & 1 \\ 0 & 0 & 0 \\ 1 & 1 & 1 \end{bmatrix}.$$

6. The system as claimed in claim 2, wherein the first predetermined threshold is 125.

7. The system as claimed in claim 1, wherein the detection unit further rebinarizes the n−1 pieces of images after detecting edges and detecting objects from the rebinarized n−1 pieces of images.

8. The system as claimed in claim 7, wherein rebinarizing the n−1 pieces of images after detecting edges means to compare the luminance value of each pixel of each image after detecting edges to a second predetermined threshold, if the luminance value of each pixel of each image after detecting edges is greater than the second predetermined threshold, the luminance value of each pixel of each image after detecting edges is set to be 255, otherwise the luminance value of each pixel of each image after detecting edges is set to be 0; detecting objects from the rebinarized n−1 images means to extract objects from each of the rebinarized n−1 pieces of images.

9. The system as claimed in claim 8, wherein the second predetermined threshold is 150.

10. The system as claimed in claim 8, wherein the system further comprises a storage unit for storing the extracted objects.

11. A method for detecting moving objects, comprising:
switching on a video capturing device to capture "n" pieces of consecutive images during a time period, wherein "n" represents a positive integer;
selecting one of the "n" pieces of images as a reference image and differentiating the other n−1 images relative to the reference image;
graying the differentiated n−1 pieces of images;
binarizing the grayed n−1 pieces of images;
blurring the binarized n−1 pieces of images;
dilating the blurred n−1 pieces of images; and
detecting edges from the dilated n−1 pieces of images.

12. The method as claimed in claim 11, wherein differentiating the n−1 pieces of images relative to the reference image means to get value differences between each image of the n−1 pieces of images and the reference image, the value differences are obtained by each pixel value represented by values of red, green, and blue of each image of the n−1 pieces of images minus each pixel value of the reference image and then taking absolute values, graying the differentiated n−1 pieces of images means that each pixel value of each differentiated image is represented by a luminance value instead of being represented by the values of red, green, and blue, binarizing the grayed n−1 pieces of images means to compare the luminance value of each pixel of each grayed image to a first predetermined threshold, if the luminance value of each pixel of each grayed image is greater than the first predetermined threshold, the luminance value of each pixel of each grayed image is set to be 255, otherwise the luminance value of each pixel of each grayed image is set to be 0, blurring the n−1 pieces of binarized images means to define a pixel whose luminance value is 255 of each binarized image as a center pixel, and then determine luminance values of other eight pixels around the center pixel, if there are at least two pixels of the eight pixels whose luminance values are 255, the luminance value of each pixel of the eight pixel is set to be 255, otherwise the luminance values of each pixel of the eight pixel and the center pixel are set to be 0; dilating the blurred n−1 pieces of images means that the luminance value of each pixel of each blurred image multiplies a matrix(M); detecting edges from the dilated n−1 pieces of images means that the luminance value of each pixel of each dilated image respectively multiplies a first matrix Sobel(V) and a second matrix Sobel(H), then take a sum, and finally divided by two.

13. The method as claimed in claim 12, wherein a first image of the "n" pieces of images is selected as the reference image.

14. The method as claimed in claim 11, further comprising:
rebinarizing the n−1 pieces of images; and
detecting objects from the rebinarized n−1 pieces of images.

15. The method as claimed in claim 14, wherein binarizing the n−1 pieces of images means to compare the luminance value of each pixel of each image after detecting edges to a second predetermined threshold, if the luminance value of each pixel of each image after detecting edges is greater than the second predetermined threshold, the luminance value of each pixel of each image after detecting edges is set to be 255, otherwise the luminance value of each pixel of each image after detecting edges is set to be 0; detecting objects from the rebinarized n−1 images means to extract objects from each of the rebinarized n−1 pieces of images.

* * * * *